(12) United States Patent
Muntianu et al.

(10) Patent No.: US 8,964,580 B2
(45) Date of Patent: Feb. 24, 2015

(54) DEVICE TOPOLOGY AND CAPABILITY DISCOVERY AND REPORTING TECHNIQUES

(75) Inventors: Adrian Muntianu, Bellevue, WA (US); Rajat Agarwal, San Jose, CA (US); Cameron Scott Buschardt, Round Rock, TX (US); Yi-Shing Chu (Michael) Chu, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 13/355,686

(22) Filed: Jan. 23, 2012

(65) Prior Publication Data
US 2013/0188520 A1 Jul. 25, 2013

(51) Int. Cl.
  *H04L 12/26* (2006.01)
  *H04L 12/28* (2006.01)
(52) U.S. Cl.
  USPC .......................................... 370/252; 370/351
(58) Field of Classification Search
  CPC ................................................ G06F 17/30389
  USPC ......... 370/229, 235, 236, 241, 252, 254, 255, 370/351
  See application file for complete search history.

(56) References Cited

U.S. PATENT DOCUMENTS 7,287,180 B1 * 10/2007 Chen et al. ...................... 714/4.3
2004/0114530 A1 * 6/2004 Cornet et al. ................. 370/252

OTHER PUBLICATIONS

Noorbakhsh, et al.; Acquisition of Extended Display Identification Data (EDID) in a Display Controller in a Power Up Mode from a Power Down Mode; Statutory Invention Registration No. US H2186 H1; Apr. 3, 2007; United States.

* cited by examiner

*Primary Examiner* — Omar Ghowrwal

(57) ABSTRACT

Techniques for the discovery of a topology of varying complexity and discovery of the capability of the devices of the topology include querying a plurality of node devices for node data. At least an initial portion of node data of one or more node devices is received in response to the query. In addition, previously determined node data is retrieved from a cache. The initial portion of node data is correlated to the previously determined node data to deduce node data for one or more node devices within a predetermined period of time. It is to be appreciated that the deduced node data may include node data beyond the initial portion of node data and/or node data for other node devices beyond the initially responding node devices. The deduced node data may then be reported to an operating system.

19 Claims, 7 Drawing Sheets

DEVICE TOPOLOGY AND CAPABILITY DISCOVERY AND REPORTING TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, servers, work stations, distributed computing platforms, gaming consoles, netbooks, smart phones, and the like have facilitated increased productivity and reduced costs in communicating and analyzing data in most areas of entertainment, education, business, and science. One common aspect of computing systems is the connection of multiple devices, such as peripheral or client devices, to a host or server device. Typically, some sort of enumeration process is utilized to discover the peripheral and/or client devices coupled to a host or server device, the capabilities of the devices and/or the state of the devices.

The enumeration process takes longer and longer to complete the more devices that are coupled together and/or the more complex the interconnections are between the devices. As the topology becomes more complex the latency incurred by the enumeration process may increase beyond a desired or acceptable period. To limit the enumeration incurred latency, some protocols place restrictions on the number of devices that can be coupled together, and/or the complexity of interconnections between the devices. Accordingly, there is a need for techniques to maintain or reduce the enumeration latency while allowing complex topologies between multiple devices.

SUMMARY OF THE INVENTION

The present technology may best be understood by referring to the following description and accompanying drawings that are used to illustrate embodiments of the present technology directed toward techniques for the discovery of devices and their capabilities within a topology of variable complexity.

In one embodiment, previously determined node data is retrieved in response to an enumeration event. Node data that uniquely identifies one or more node devices is determined from the set of previously determined node data. A plurality of node devices are target queried for the unique node data. In response to the target query, an initial portion of node data is received for one or more initially responding node devices. The initial portion of node data of the one or more initially responding node devices is correlated to the previously determined node data to deduce node data for one or more deduced devices. It is to be appreciated that the deduced node data may include node data beyond the initial portion of node data and/or node data for other node devices beyond the initially responding node devices. The deduced node data may then be reported to an operating system within a predetermined period.

In addition, the plurality of devices may be generally queried for further node data. The additional node data for the plurality of node devices is received in response to the general query. The node data for the plurality of devices is validated from the initial portion of node data and the additional node data. The differences between the validated node data and the deduced node data is then determined and reported to the operating system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
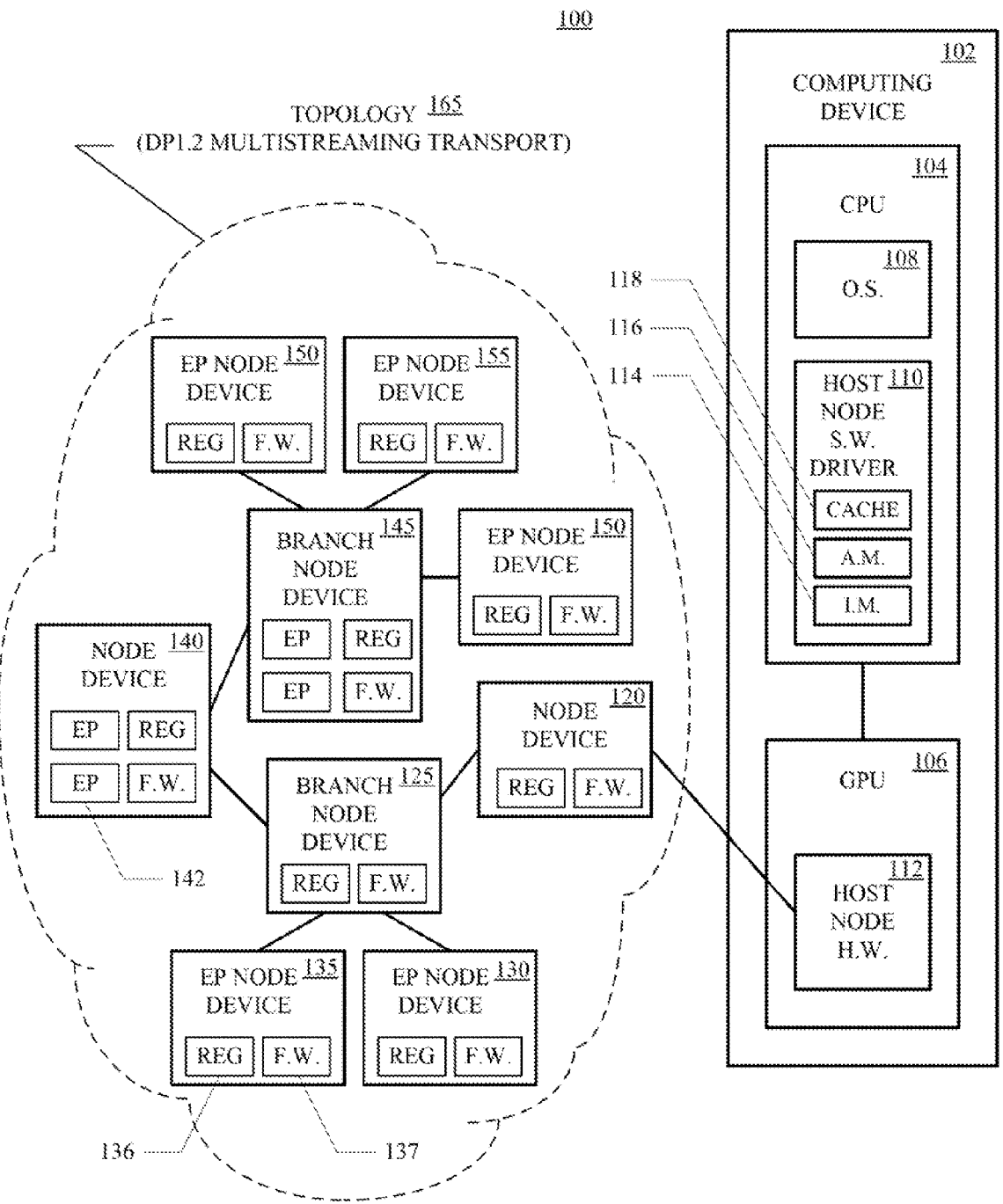
FIG. 1 shows a block diagram of an exemplary computing platform, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring now to FIG. 1, an exemplary computing platform, in accordance with one embodiment of the present technology, is shown. The computing platform 100 includes one or more computing devices 102 and a plurality of client and/or peripheral devices. The client and/or peripheral devices are herein after referred to as node devices 120-160. In one embodiment, the computing device 102 includes one or more processing units 104, 106, one or more computing device readable media (not shown), and the like, communicatively coupled together by one or more communication busses. In one implementation, the computing device includes a processor for executing an operating system, one or more applications, one or more utilities, one or more drivers, and/or the like stored in one or more computing device readable media.

Each computing device 102 includes a host node 110, 112 that may be communicatively coupled to any number of node devices 120-160 in any topology 165 of variable complexity. Each host node 110, 112, in one implementation, is predominantly a source of data, while the node devices 120-160 are predominantly sinks of the data. The node devices 120-160 may be branch node devices, endpoint node devices, and/or the like. Node devices 120-160 may include one or more endpoint nodes 142 internal to the device and/or may be coupled to one or more external endpoint or branch node devices. Each node device 120-160 includes one or more registers 136 for storing one or more operating parameters of the device. Each node device 120-160 also includes hardware, software and/or firmware 137 and/or any combination thereof for implementing functions of the node device, which include communicating with other node devices and/or one or more host devices.

In one implementation, the computing device may be a desktop personal computer (PC), a laptop (PC), a tablet (PC), a server, a work station, a distributed computing platform, a gaming console, a netbook, a smart phone, and/or the like. The host node 110, 112 of the computing device 102 may be a display controller output device, and a plurality of display devices may be communicatively coupled to the display controller output device by a multi-stream transport topology. For example, a plurality of monitors may be communicatively coupled to a display controller output of a work station device by a DP 1.2 compliant multi-stream transport topology 165.

Each host node 110, 112 includes hardware, software and/or firmware for implementing function's of the host node, which includes enumerating and communicating with the node devices 120-160 in the topology 165. In one embodiment, the host node includes host node hardware 112 and a host node software driver 110. The host node hardware 112 is communicatively coupled between the node devices 120-160 and the host node driver 110. The host node driver 110 is communicatively coupled between the host node hardware 112 and the operating system 114. In one implementation, the host device driver 110 executes on the central processing unit 104 in the kernel mode under control of the operating system 1108. In one implementation, the host node hardware 112 may be implemented in the graphics process unit 118.

In one implementation, the host node software driver 110 includes an interface module 114 and an algorithm module 116. The host node software driver 110 also accesses a parameter cache 118. However, it is appreciated that the host node 110, 112 may be implemented in a number of other combinations of software, hardware and/or firmware. For example one or more functions of the host node 110, 112 may be combined together or further broken into separate elements. For instance, the algorithms of the algorithm module 116 may be stored in the same computing device readable media as the parameter cache 118 in separate data structures or may be combined into a single data structure. Likewise parts of the algorithm module 116 and interface module 114 may be combined into a single module or further divided into additional modules. In another example, the algorithm module may be divided into a setup module for creating algorithms and a query module for enumerating the node devices 120-160 according to one or more algorithms, while the interface module 114 may apply one or more other algorithms to deduce, correlate and/or validate node data received in response to the queries.

Figure 2A:
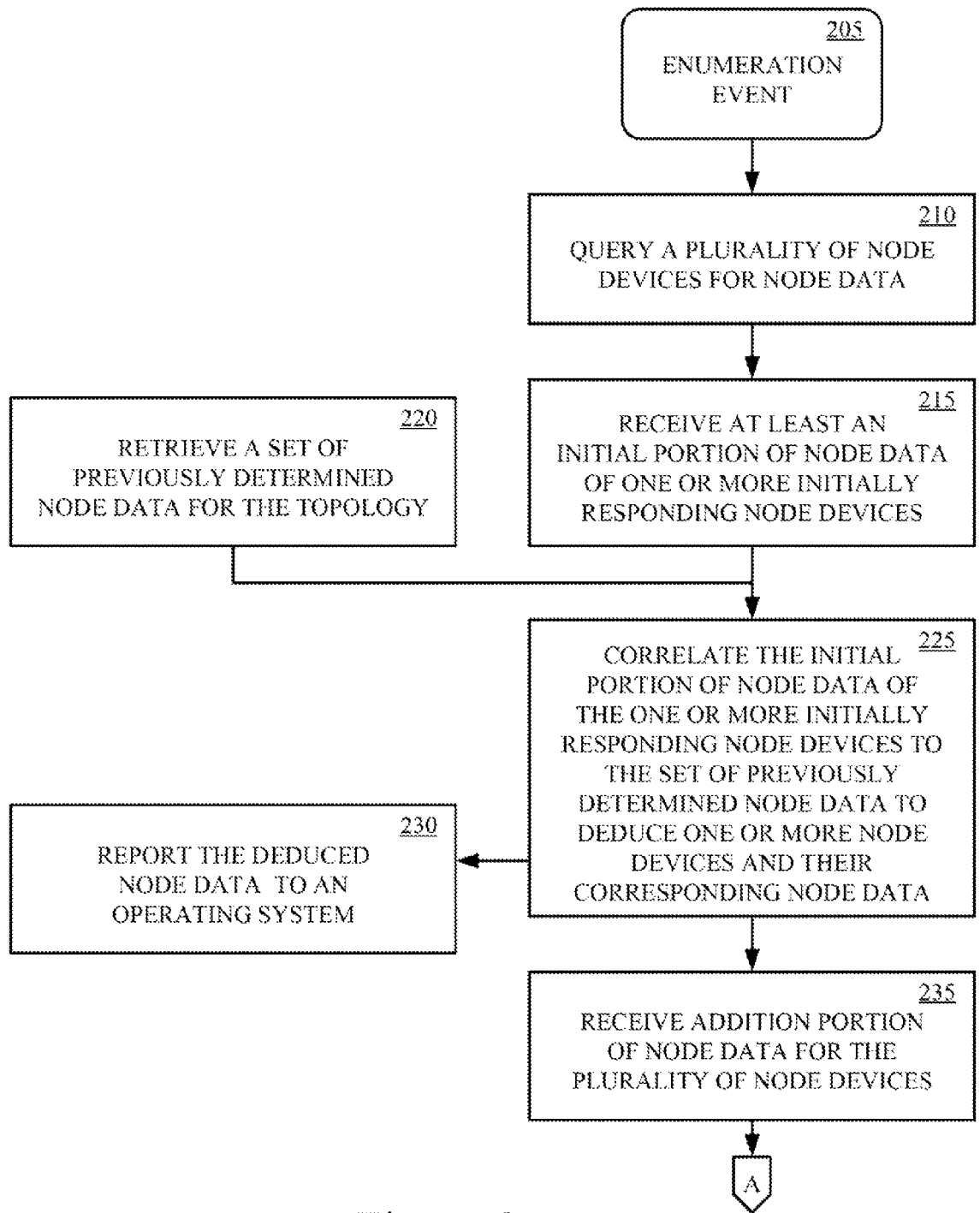
FIGS. 2A-2B show a flow diagram of a method of runtime enumerating the exemplary computing platform, in accordance with one embodiment of the present technology.
Figure 2B:
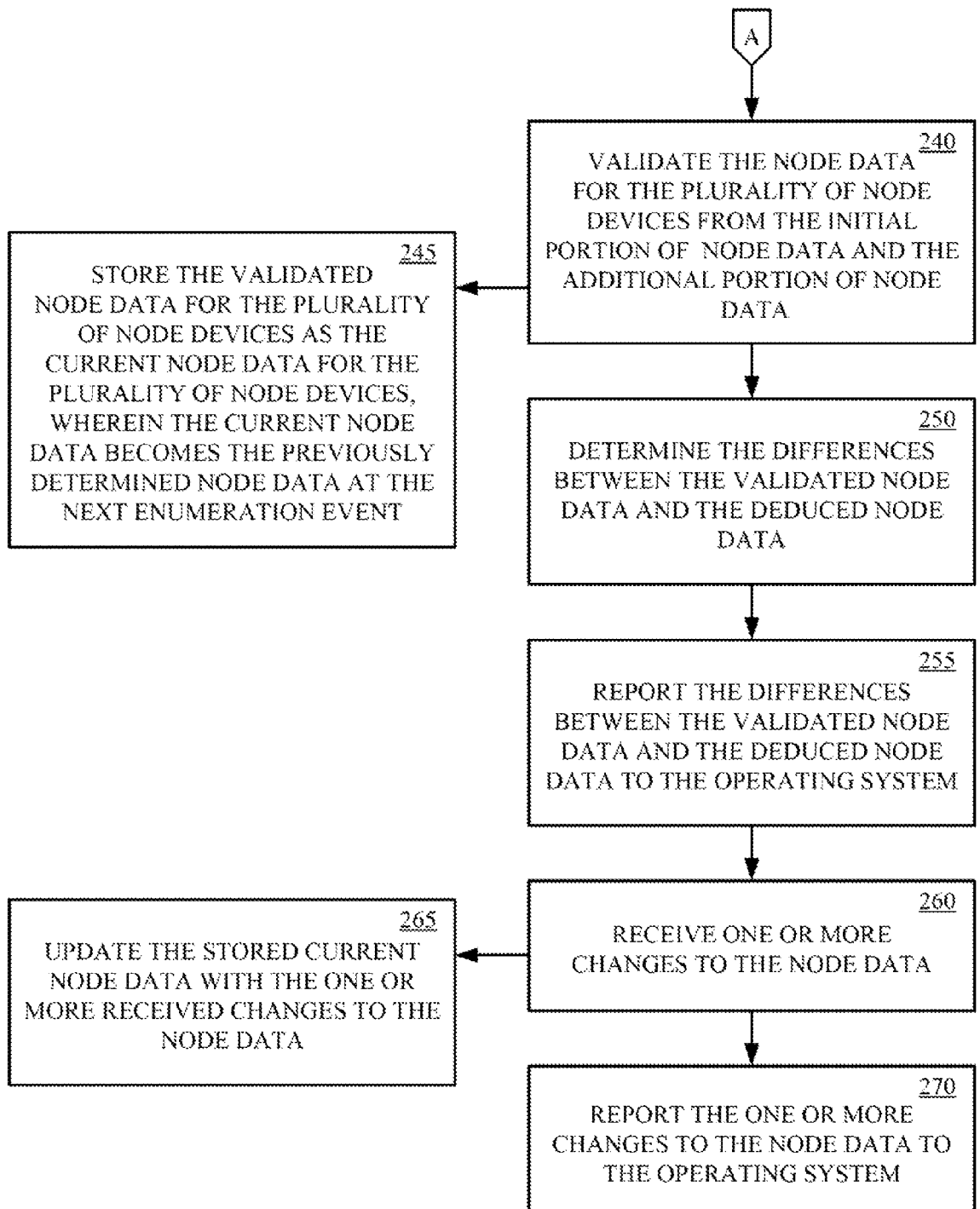

Operation of the exemplary computing platform 100 will be further explained with reference to FIGS. 2A-2B, 3A-3C and 4. Referring now to FIGS. 2A-2B, a method of runtime enumerating the exemplary computing platform, in accordance with one embodiment of the present technology, is shown. The method may begin in response to an enumeration event 205. The enumeration event may include system boot, reboot, power events such as resume from suspend and resume from hibernation, connection of a host device, and/or the like. In one implementation, the host node driver 110 receives notification of the enumeration event from the operating system 108.

In response to an enumeration event, a plurality of node devices 120-160 are queried for their corresponding node data, at 210. The queries may be based upon previously determined node data in the parameter cache 118. In one implementation, the host node driver 110 controls the host node hardware 112 to query a plurality of node devices 120-160 for their respective node data. The host node hardware 112 may read one or more parameters, such as a device identifier, manufacturer identifier, and or the like from one or more registers 136. The query is utilized to apply a gradual, asynchronous detection of the node devices 120-160.

At 215, at least an initial portion of node data of one or more initially responding node devices 120, 125 is received within a predetermined period of time. In one implementation the initial portion of node data of one or more node devices is received by the host node driver 110 through the host node hardware 112 in response to the query. The node data may include the identity of one or more node devices 120, 125 participating in the topology, the capabilities, current state and the ability to control the other node devices, the type and status of the interconnects between the node device and other node devices that are part of the topology, an awareness of events that affect the topology such as the arrival or departure of node devices, changes in their state, modifications in the capabilities or the interconnecting communication links, and/or the like. In one implementation, the node data includes Extended Display IDentification (EDID) data.

A set of previously determined node data for the topology is retrieved, at 220. The previously determined node data describes the last known topology of the computing platform, including the identity of each node device participating in the topology, the capabilities, state and the ability to control other node devices, the type and status of the interconnects between the node devices that are part of the topology, an awareness of events that affect the topology such as the arrival or departure of node devices, changes in their state, modification in the capabilities or the interconnecting communication links, and/or the like. In one implementation, the host node driver 110 retrieves the set of previously determined node data from a cached data structure. The caching mechanism allows for fast comparison of previously determined topology node data to the node data received in response to the query. The process of retrieving the set of previously determined node data for the topology may be performed substantially in parallel with the processes of querying and receiving the initial portion of the node data.

At 225, the initial portion of node data of the one or more initially responding node devices 120, 125 is correlated to the previously determined node data to deduce node data for one or more devices. It is to be appreciated that the deduced node data may include node data beyond the initial portion of node data and/or node data for other node devices beyond the initially responding node devices. In one implementation, the initial portion of node data of the one or more initially responding node devices is correlated to the previously determined node data using one or more predetermined enumeration algorithms. In one implementation the correlation is performed by the host node driver 110 using one or more enumeration algorithms. In one implementation, one or more data enumeration algorithms match one or more unique node data parameters to the previously determined node data to deduce the presence of one or more node devices in the topology and the corresponding node data for the one or more deduced node devices. The node data may be deduced within a predetermined period and/or may be deduced within a predetermined level of accuracy. For example, an enumeration algorithm may correlate the device identifier and current state of the two node devices 120, 125 nearest to the host node 110, 112 based upon their corresponding network addresses to a set of previously determined node data including the device identifiers, capabilities and state for each of the devices in the previously determined node data. Accordingly, the method includes the early and accurate detection of one or more node devices 120, 125 that are in topology proximity to the host node device 110, 112.

At 230, the node data for the one or more deduced devices is reported to the operating system. In one implementation, the host node driver 110 reports the node data for the one or more deduced node devices to the operating system 108 within a predetermined maximum latency. For example, the identity of the two node devices 120, 125 nearest to the host node device 110, 112, the capabilities, current state and the like are reported to the operating system 108.

At 235, an additional portion of node data is received for the plurality of node devices 120-160. In one implementation, the host node driver 110 receives the additional portion of node data for the plurality of node device 120-160 communicatively coupled to the host node 110, 112. For example, one or more additional portions of the node data for the two node devices 120, 125 nearest to the host node 110, 112 may be received, and all of the node data for the rest of the node devices 130-160 in the topology that are communicatively coupled to the host node device 110, 112 are also received.

At 240, the initially node data and the additional node data is validated. In one implementation, the host node driver 110 may compare the node data as it is received from responding node devices 120-160 with the previously determined node data to validate the data. In one implementation, the host node driver 110 validates the additional portion of received node data against the previously determined node data using one or more enumeration algorithms. At 245, the validated node data for the plurality of node devices 120-160 is stored as the current node data for the plurality of node devices 120-160. Thereafter, the current node data becomes the previously determined node data at the next enumeration event. In one implementation, the host node driver 110 may cache all of the received node data in the parameter cache 118. In another implementation, the host node driver 110 may instead simply update the node data in the parameter cache 118 with any received changes between the currently received node data and the previously determined node data.

At 250, the differences between the validated node data and the initially deduced node data are determined. In one implementation, the host node driver 110 determines any differences between the validated node data and the deduced node data. At 255, the differences between the validated node data and the deduced node data are reported to the operating system 108. In one implementation the host node driver 110 reports any differences between the validated node data and the deduced node data to the operating system 108.

Optionally, one or more changes to the node data may be received, at 260. In one implementation, the host node driver 110 may continue to receive updates to the node data as it changes in response to changes in the topology. At 265, the stored current node data is updated with the one or more received changes to the node data. In one implementation, the host node driver 110 may update the cached node data with any received changes to the node data. At 260, the one or more changes to the node data may also be reported to the operating system 108. In one implementation the host node driver 110 reports any changes to the node data that to the operating system 108.

Accordingly, embodiments of the present technology advantageously provides for early and accurate detection of node devices arranged in topologies of any given complexity. One or more node devices can be deduced within a predetermined latency during the enumeration of the entire topology. In comparison, the reporting in conventional enumeration techniques is governed by maximum latencies imposed by the operating system that controls the functions of the host node device 110, 112 and all of the node devices 120-160. In the conventional techniques, the node devices participating in a topology may respond within a given maximum latency during enumeration. The enumeration response latencies may be an order of magnitude or longer than the limits imposed by the operating system and the established norms defining a desirable user experience. Further complicating matters is the fact that many times the topologies are such that the induced latencies are cumulative in the conventional techniques. In addition, the conventional techniques typically suffer from intermittent, chatty and the like enumeration events as a result of the undesirable latencies. Embodiments of the present technology, however, provide a reporting mechanism that emphasizes a robust initial detection and reduces or eliminates intermittent, chatty and the like enumeration events.

Figure 3A:
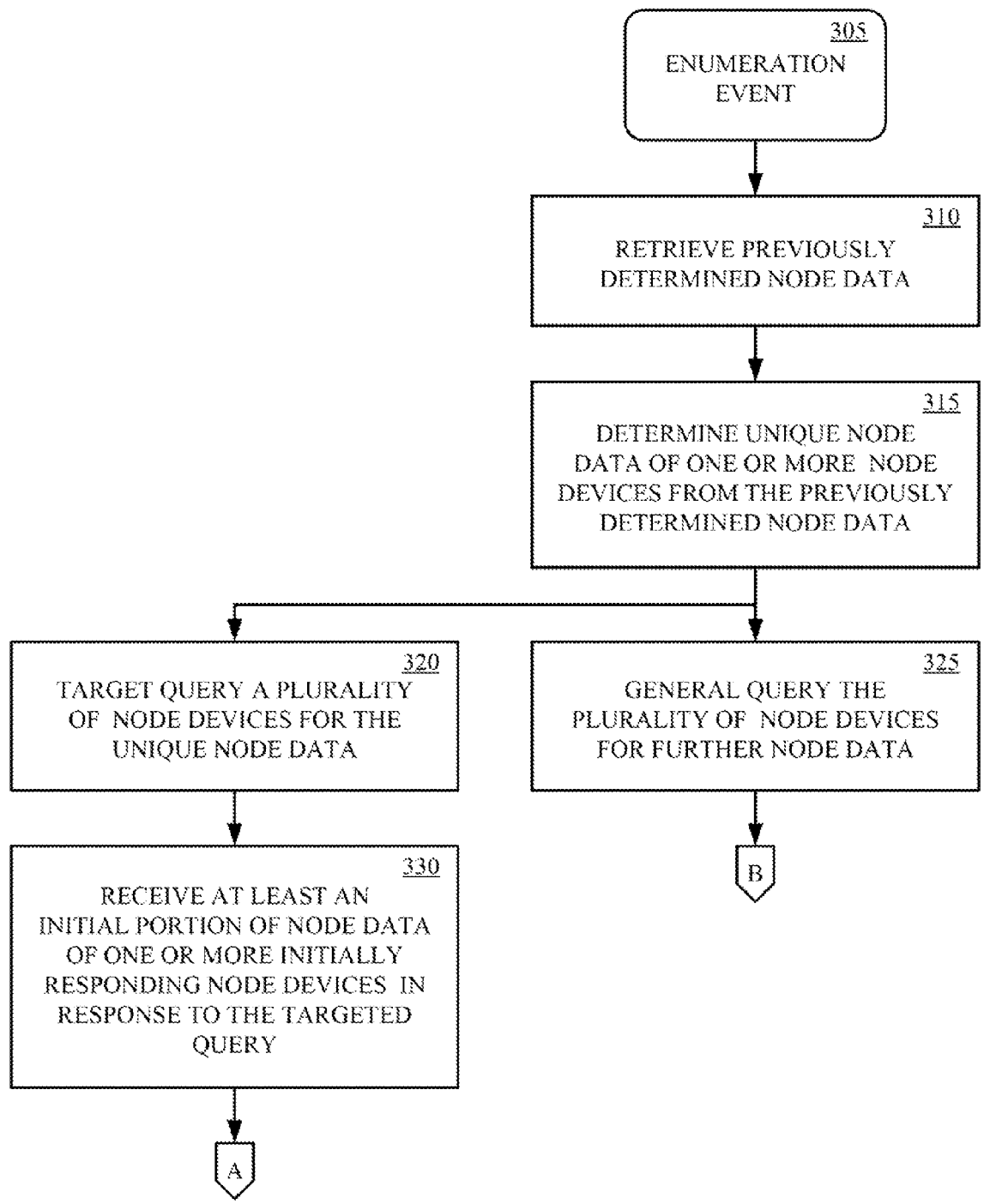
FIGS. 3A-3C show a flow diagram of a method of runtime enumerating the exemplary computing platform, in accordance with another embodiment of the present technology.
Figure 3B:
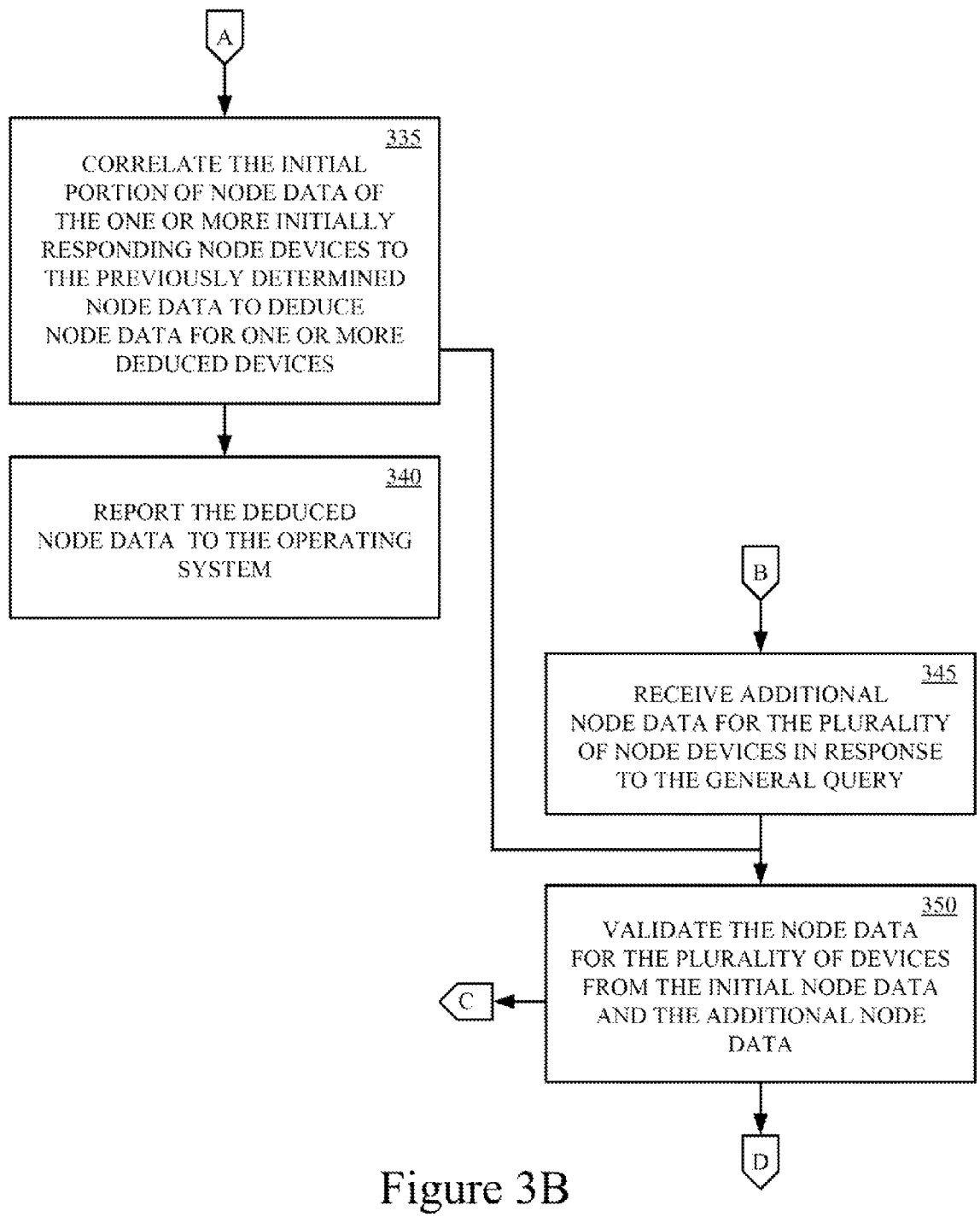
Figure 3C:
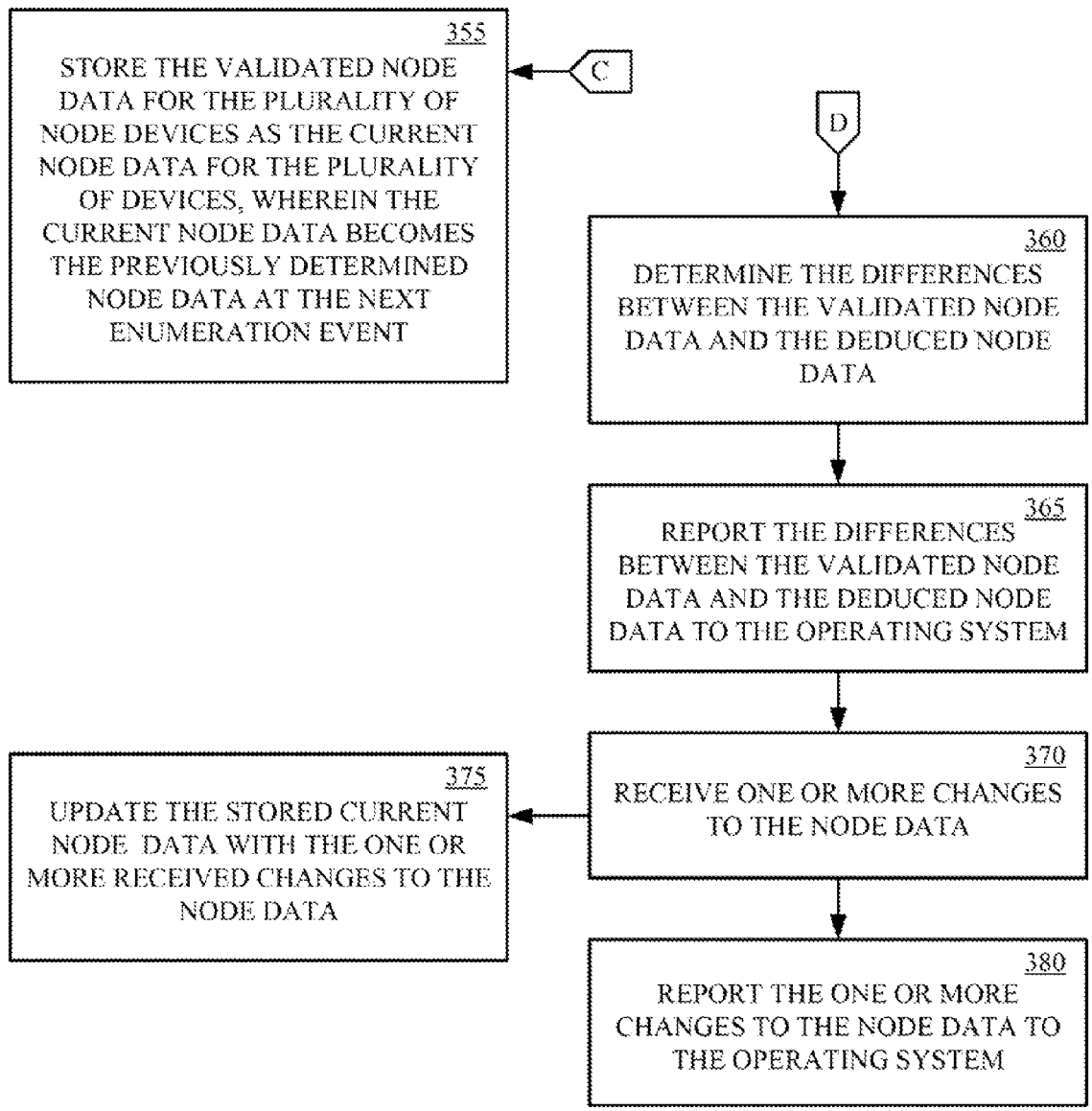

Referring now to FIGS. 3A-3C, a method of runtime enumerating the exemplary computing platform, in accordance with another embodiment of the present technology, is shown. The method may begin in response to an enumeration event 305. The enumeration event may include system boot, reboot, power events such as resume from suspend and resume from hibernation, connection of a host device, and/or the like. In one implementation, an interface module 114 of the host node driver 110 receives notification of the enumeration event from the operating system 108. In response to the enumeration event, a set of previously determined node data is retrieved, at 310. The previously determined node data describes the last know topology of the system, including the identity of each sink device participating in the topology, the capabilities, state and the ability to control such devices, the type and status of the interconnects between the devices that are part of the topology, and awareness of events that affect the topology such as the arrival or departure of node devices, changes in their state, modification in the capabilities of the interconnecting communication links, and/or the like. In one implementation, the interface module 114 retrieves the set of previously determined node device data from a parameter cache 118 of the host node driver 110. The parameter cache 118 allows for fast comparison of previously determined node data to node data received in response to the query.

At 315, unique node data for each of one or more devices is determined from the previously determined node data. The unique node data may be a minimum set of attributes and/or parameters that can positively identify a node device. In one implementation, the interface module 114 determines unique node data that identifiers one or more devices in close topology proximity to the host node 110, 112 from the previously determined node data. The unique node data may be determined by applying one or more enumeration algorithms from an algorithm module 116 of the host node driver 110. For example, the cache of previously determined node data may be parsed to determine one or more node devices in close topology proximity to the host node 110, 112 from the network addresses of the node devices 120-160. The node data for the one or more node devices 120, 125 in close proximity may be further parsed to determine one or more parameters that uniquely identify each of one or more devices. In one implementation, the algorithm module 116 generates a targeted query based on the one or more node devices and the parameters that uniquely identify one or more node device in close proximity to the host node 110, 112 according to one or more heuristic query algorithms. The caching of predetermined node data and the use of one or more applicable enumeration algorithms allow for fast generation of target querying for the unique node data.

At 320, a plurality of devices are target queried for the unique node data. In one implementation, the interface module 114 controls the host node hardware 112 to query one or more node devices 120, 125 for the unique node data. The interface module 114 may control the host node hardware 112 to perform a query based on one or more query algorithms. The host node hardware 112 may read one or more parameters, such as a device identifier, manufacturer identifier, and or the like from one or more registers, and/or receive one or more parameters, such as device identifier, protocol attributes, device states, identifiers of neighbor device, and the like from firmware, and/or the like. The targeted query is utilized to apply a gradual, asynchronous detection of the sink devices utilizing one or more applicable heuristic algorithms. The plurality of node devices 120-160 are also generally queried for further node data, at 325. In one implementation, the interface module 114 controls the host node hardware 112 to query the plurality of node devices 120-160 for further node data.

At 330, at least an initial portion of node data of one or more initially responding node devices 120, 125 is received within a predetermined period in response to the targeted query. In one implementation the initial portion of node data of one or more node devices is received by the interface module 114 through the host node hardware 112 in response to the targeted query. The node data may include the identity of one or more node devices 120, 125 in close topology proximity to the host node, the capabilities, current state and the ability to control other node devices, the type and status of the interconnects between the node device and other node devices that are part of the topology, an awareness of events that affect the topology such as the arrival or departure of node devices, changes in their state, modification's in the capabilities or the interconnecting communication links, and/or the like. In one implementation, the node data includes Extended Display IDentification (EDID) data. The targeted query of the plurality of devices according to one or more enumeration algorithms enables early accurate diction of the node devices in topology proximity to the host node device.

At 355, the initial portion of node data of the one or more initially responding devices 120, 125 is correlated to the cached set of previously determined node data to deduce node data for one or more devices. It is to be appreciated that the deduced node data may include node data beyond the initial portion of node data and/or node data for other node devices beyond the initially responding node devices. The cached previously determined node data enables fast comparison with the node data of the initially responding node devices to deduce the identity of one or more node devices, their current arrangement, and the value of corresponding node data with a reasonable degree of certainty within a predetermined period of time, without having to enumerate all of the devices in the topology. The predetermined period of time may be selected to satisfy a maximum latency metric. In one implementation, the initial portion of node data of the one or more initially responding node devices is correlated to the previously determined node data using one or more correlation and/or validation algorithms. In one implementation the correlation is performed by the interface module 114 using one or more heuristic data correlation/validation algorithms from the algorithm module 116. For example, heuristic data correlation/validation algorithm may correlate the device identifier and current state of the two node devices 120, 125 nearest to the host node 110, 112 based upon their corresponding network addresses to a set of previously determined node data including the device identifiers, capabilities and state for each of the devices in the cached 118 previously determined node data.

At 340, the deduced node data for the one or more deduced devices is reported to the operating system 108. In one implementation, the interface module 114 reports the deduced data for the one or more deduced devices to the operating system 108 within a predetermined maximum latency. For example, the identity of the two node devices 120, 125 nearest to the host node device 110, 112, the capabilities, current state and the like are reported to the operating system 108.

At 345, additional node data is received for the plurality of node devices in response to the general query. In one implementation, the interface module 114 receives additional node data for the plurality of node devices communicatively coupled to the host node 110, 112. The additional node data may be received by the interface module 114 after the predetermined period in response to the general query. The receipt of additional node data in response to the general query enables a gradual detection of node devices 130-160 in relative remote topology proximity to the host node 110, 112. The data may be received asynchronously in turn from each of the plurality of node devices 120-160 until all the corresponding node data has been received by the host node 110, 112. For example, one or more additional portions of the node data for the two node devices 120, 125 nearest to the host node 110, 112 may be received, and all of the node data for the rest of the node devices 130-160 in the topology that are communicatively coupled to the host node device 110, 112 is also received.

At 350, the node data from the initial responding nodes and the additional node data from the later responding nodes is validated. In one implementation, the interface module 114 may apply one or more correlation/validation algorithms from the algorithm module 116 to validate the node data received in response to the targeted and general queries. For example, a heuristic correlation/validation algorithm may compare the additional data in combination with the initial portion of received node data to the previously determined node data to confirm the accuracy of the initially deduced node data and/or additional node data for the one or more additional devices. At 355, the validated node data for the plurality of devices 120-160 is stored as the current node data for the plurality of devices. Thereafter, the current node data becomes the previously determined node data at the next enumeration event. In one implementation, after node data has been received and validated for each of the node devices in the topology, the interface module 114 caches 118 the validated node data, which will become the previously determined node data at the next enumeration event.

At 360, the differences between the validated node data and the deduced node data are determined. In one implementation, the interface module 114 determines the differences between the validated node data and the deduced node data. At 365, the differences between the validated node data and the deduced node data are reported to the operating system 108. In one implementation, the interface module 114 reports the differences between the validated node data and the deduced node data to the operating system 108.

Optionally, one or more changes to the node data may be received, at 370. In one implementation, the interface module 114 may receive via the host node hardware 112 one or more changes to the node data in response to changes in the topology. For example, a new device may connect to the topology. In another example, the state of another device 155 may change. At 375, the stored current node data is updated with the one or more received changes to the node data. In one implementation, the interface module 114 may update the cached 118 node data with the received changes. At 380, the one or more changes to the node data 118 are also reported to the operating system. In one implementation, the interface module 114 may report the one or more changes to the node data to the operating system 108.

Figure 4:
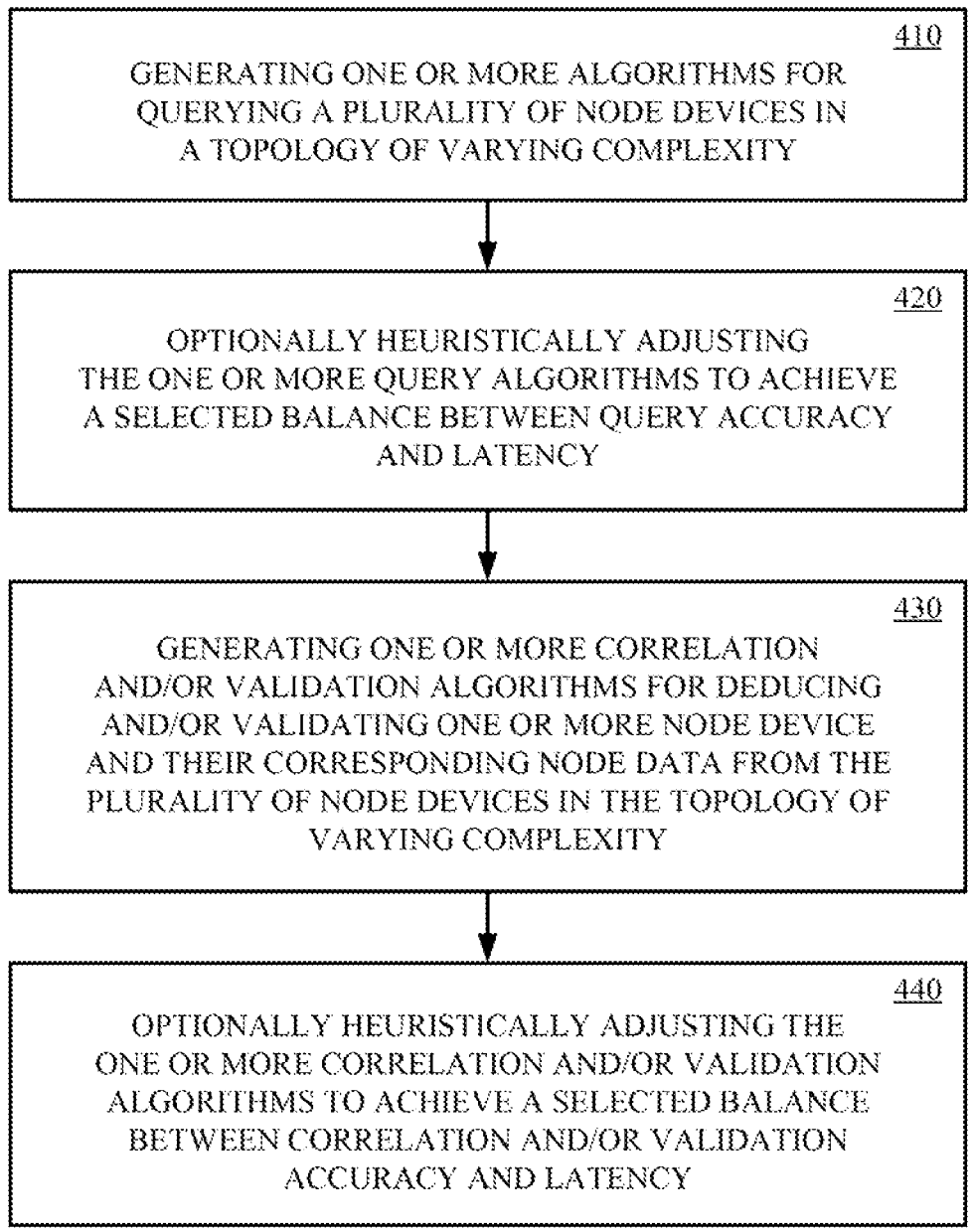
FIG. 4 shows a flow diagram of an enumeration setup method, in accordance with one embodiment of the present technology.

Referring now to FIG. 4, an enumeration setup method, in accordance with one embodiment of the present technology, is shown. The method includes generating one or more algorithms for querying a plurality of node devices communicatively coupled in a topology of varying complexity, at 410. The one or more query algorithms may be generated for enumerating one or more node devices within a predetermined latency and/or predetermined accuracy The query algorithms may be generated by first defining one or more unique sets of attributes and/or attribute values that uniquely identify one or more node devices. The one or more unique sets of attributes and/or attribute values are then used to specify one or more queries for enumerating the plurality of node device in the given topology. In one implementation, the interface module 114 provides for user selection and/or specification of the unique node data. The unique node data is used to deduce nodes in the given topology with a desired level of accuracy and/or within a desired period of time. For example, a device type, a protocol attribute and a data rate may positively identify a given node device. Another node device may be identified by its device type and an external control signal attribute. An address of yet another node device may indicate the locality of device with respect to the host node. One or more algorithms for querying one or more node devices in relative close proximity to the hose node may be created based upon the unique identifying address value, device type, protocol attribute value and data rate.

At 420, the one or more query algorithms may be heuristically adjusted to achieve a selected balance between accuracy and latency based on one or more design criteria. The one or more algorithms, in which the most appropriate solution of several alternative methods, may be selected at successive stages of the enumeration processes. The heuristic algorithms may be base on a speculative formulation serving as a guide to generating the queries and refined based on empirical analysis to achieve a desire level of query accuracy with a desired query latency. In one implementation, the interface module 114 in combination with the algorithm module 116 enables the design of a predictive mechanism that has knobs for trading off between a desired query accuracy and a desired latency for performing the query.

At 430, one or more correlation and/or validation algorithms are generated for deducing one or more node device and their corresponding node data from the plurality of node devices communicatively coupled in a topology of varying given complexity. The one or more correlation/validation algorithms may be generated for comparing the results of the query to a set of previously determined node data for the given topology within a predetermined latency and/or predetermined accuracy.

At 440, the one or more correlation/validation algorithms may be heuristically adjusted to achieve a selected balance between accuracy and latency based on one or more design criteria. The one or more algorithms, in which the most appropriate solution of several alternative methods, may be selected at successive stage of the enumeration processes. The heuristic algorithms may be base on a speculative formulation serving as a guide for matching, and refined based on empirical analysis to achieve a desired level of accuracy with a desired latency. In one implementation, the interface module 114 in combination with the algorithm module 116 enables the design of a validation mechanism that has knobs for trading off between a desired correlation accuracy and a desired latency for performing the correlation.

Accordingly, embodiments of the present technology advantageously provide for early and accurate detection of node devices arranged in topologies of any given complexity. One or more node devices can be deduced within a predetermined latency during the enumeration of the entire topology. Embodiments therefore advantageously provide a reporting mechanism that emphasizes a robust initial detection and reduces or eliminates intermittent, chatty and the like enumeration events.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   querying, by a device, a plurality of node devices for node data based upon one or more heuristic query algorithms to achieve a selected balance between query accuracy and query latency;
   receiving at least an initial portion of node data of one or more initially responding node devices;
   retrieving a set of previously determined node data;
   correlating the initial portion of node data of the one or more initially responding node devices to the set of previously determined node data to deduce node data for one or more deduced node devices; and
   reporting the deduced node data to an operating system.

2. The method according to claim 1, wherein querying the plurality of node devices for node data is performed in response to an enumeration event.

3. The method according to claim 1, further comprising correlating the initial portion of node data of the one or more initially responding node devices to the set of previously determined node data based upon one or more heuristic correlation algorithms to achieve a selected balance between correlation accuracy and correlation latency.

4. The method according to claim 1, further comprising:
   receiving an additional portion of node data for the plurality of node devices;
   validating the node data for the plurality of node devices from the initial portion of node data and the additional portion of node data;
   determining differences between the validated node data and the deduced node data; and
   reporting the differences between the validated node data and the deduced node data.

5. The method according to claim 4, further comprising:
   storing the validated node data as current node data for the plurality of devices, wherein the current node data becomes the previously determined node data at a next enumeration event.

6. The method according to claim 4, further comprising validating the node data for the plurality of node devices from the initial portion of node data and the additional portion of node data based upon one or more heuristic validation algorithms to achieve a selected balance between validation accuracy and validation latency.

7. The method according to claim 4, further comprising:
   receiving one or more changes to the node data; and
   reporting the one or more changes to the node data to the operating system.

8. The method according to claim 7, further comprising:
   updating the stored current node data with the one or more received changes to the node data.

9. A method comprising:
   retrieving previously determined node data in response to an enumeration event;
   determining unique node data of one or more node devices from the previously determined node data;
   target querying, by a device, a plurality of node devices based on the unique node data and one or more heuristic query algorithms to achieve a selected balance between query accuracy and query latency;
   receiving at least an initial portion of node data of one or more initially responding node devices in response to the target query;
   correlating the initial portion of node data of the one or more initially responding node devices to the previously determined node data to deduce node data for one or more deduced devices; and
   reporting the deduced node data to an operating system within a predetermined period.

10. The method according to claim 9, further comprising:
    general querying the plurality of devices for further node data;
    receiving additional node data for the plurality of node devices in response to the general query;
    validating the node data for the plurality of devices from the initial node data and the additional node data;
    determining the differences between the validated node data and the deduced node data; and
    reporting the differences between the validated node data and the deduced node data to the operating system.

11. The method according to claim 10, further comprising:
    storing the validated node data for the plurality of node devices as current node data for the plurality of devices, wherein the current node data becomes the previously determined node data at a next enumeration event.

12. The method according to claim 11, further comprising:
    receiving one or more changes to the node data; and
    reporting the one or more changes to the node data to the operating system.

13. The method according to claim 12, further comprising:
    updating the stored current node data with the one or more received changes to the node data.

14. The method according to claim 13, further comprising generating the one or more algorithms for target querying the plurality of node device for node data.

15. The method according to claim 14, further comprising heuristically adjusting the one or more query algorithms to achieve a selected balance between query accuracy and query latency.

16. The method according to claim 15, further comprising generating one or more algorithms for correlating the initial node data of the one or more initially responding node devices to the previously determined node data.

17. The method according to claim 16, further comprising heuristically adjusting the one or more correlation algorithms to achieve a selected balance between correlation accuracy and correlation latency.

18. The method according to claim 17, further comprising generating one or more algorithms for validating the node data for the plurality of devices from the initial node data and the additional node data.

19. The method according to claim 18, further comprising heuristically adjusting the one or more validation algorithms to achieve a selected balance between validation accuracy and validation latency.

* * * * *